United States Patent
Wang et al.

(10) Patent No.: US 10,891,499 B2
(45) Date of Patent: Jan. 12, 2021

(54) TARGET DETECTION METHOD AND SYSTEM

(71) Applicant: SUTENG INNOVATION TECHNOLOGY CO., LTD., Shenzhen (CN)

(72) Inventors: Bin Wang, Shenzhen (CN); Yingying Zhang, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 110 days.

(21) Appl. No.: 16/327,685

(22) PCT Filed: Aug. 23, 2016

(86) PCT No.: PCT/CN2016/096358
§ 371 (c)(1),
(2) Date: Feb. 22, 2019

(87) PCT Pub. No.: WO2018/035711
PCT Pub. Date: Mar. 1, 2018

(65) Prior Publication Data
US 2019/0228239 A1    Jul. 25, 2019

(51) Int. Cl.
*G06K 9/00* (2006.01)
*G06K 9/32* (2006.01)
*G01S 13/93* (2020.01)

(52) U.S. Cl.
CPC .......... *G06K 9/00805* (2013.01); *G01S 13/93* (2013.01); *G06K 9/3241* (2013.01)

(58) Field of Classification Search
CPC ... G06K 9/00805; G06K 9/3241; G01S 13/93
(Continued)

(56) References Cited

U.S. PATENT DOCUMENTS

| 5,341,344 A | * | 8/1994 | O'Brien | G01S 13/931 367/96 |
| 2004/0054473 A1 | * | 3/2004 | Shimomura | G06T 7/248 701/301 |

(Continued)

FOREIGN PATENT DOCUMENTS

| CN | 101626493 A | 1/2010 |
| CN | 102508246 A | 6/2012 |

(Continued)

OTHER PUBLICATIONS

Office Action dated Mar. 2, 2018 issued in corresponding Chinese Patent Application No. 201610710512.6 (7 pages).

(Continued)

*Primary Examiner* — Juan A Torres
(74) *Attorney, Agent, or Firm* — Bayes PLLC

(57) ABSTRACT

A target detection method, system and controller. The method comprises: receiving first scan data transmitted by a radar, the first scan data being obtained after the radar performs a first type of scanning on a first target region; receiving image data transmitted by a digital image device, the image data being obtained after the digital image device images a second target region, an overlapping region existing between the second target region and the first target region; according to the first scan data, finding image information corresponding to obstacle targets from the image data so as to identify the types of the target obstacles; when it is determined according to the types of the target obstacles that an obstacle target that needs to be avoided exists, controlling the radar to perform a second type of scanning on the obstacle target that needs to be avoided and tracking same, the precision of the second type of scanning being greater than the precision of the first type of scanning.

17 Claims, 4 Drawing Sheets

(58) Field of Classification Search
USPC .......................................................... 382/103
See application file for complete search history.

(56) References Cited

U.S. PATENT DOCUMENTS

2008/0304040 A1* 12/2008 Greenberg ............. G01B 11/00
356/4.01
2011/0084870 A1 4/2011 Kondo et al.

FOREIGN PATENT DOCUMENTS

| CN | 103176185 B | 1/2015 |
|----|-------------|---------|
| CN | 104978568 A | 10/2015 |
| CN | 105216792 A | 1/2016 |
| CN | 105223956 A | 1/2016 |
| CN | 105480227 A | 4/2016 |
| CN | 105718888 A | 6/2016 |
| CN | 106249239 A | 12/2016 |
| WO | 2005080119 A1 | 9/2005 |

OTHER PUBLICATIONS

International Search Report dated May 25, 2017 in the parent application PCT/CN2016/096358. 4 pages.

\* cited by examiner

TARGET DETECTION METHOD AND SYSTEM

CROSS REFERENCE TO RELATED APPLICATION

This application is a National Phase filing under 35 U.S.C. § 371 of PCT/CN2016/096358 filed on Aug. 23, 2016, entitled "TARGET DETECTION METHOD AND SYSTEM", which is incorporated by reference in its entirety.

TECHNICAL FIELD

The present disclosure relates to the field of autonomous driving technology, and more particularly relates to a target detection method, a system, and a controller.

BACKGROUND

With the development and innovation of technology, autonomous driving technology is maturing. The autonomous driving vehicle is an intelligent vehicle that senses road environment via an in-vehicle sensing system, automatically plans a driving route, and controls the vehicle to reach a predetermined destination. It utilizes an on-board sensor to sense surrounding environment of the vehicle, and controls steering and speed of the vehicle according to information of road, vehicle position, and obstacle target obtained by the sensing, so that the vehicle can travel safely and reliably on the road.

However, due to complexity and variability of road traffic, the obstacle targets such as pedestrians and vehicles is required to be accurately detected in real time for reasonable circumvention so as to improve driving safety. Thus, how to improve an accuracy of detecting an obstacle target is an urgent problem to be solved.

SUMMARY

Accordingly, it is necessary to provide a target detection method, a system, and a controller capable of improving an accuracy of detecting an obstacle target.

A target detection method includes:
receiving first scan data transmitted by a radar; the first scan data being obtained by the radar scanning a first field of view with a first scanning type;
receiving image data transmitted by a camera device; the image data being obtained by the camera device imaging a second field of view; and the second field of view and the first field of view having an overlapping region;
searching for image information corresponding to each obstacle target from the image data according to the first scan data, so as to identify a type of each obstacle target; and
when determining that there is an obstacle target required to be circumvented according to the type of each obstacle target, controlling the radar to scan the obstacle target required to be circumvented with a second scanning type and trace; wherein the scanning accuracy of the second scanning type is greater than the scanning accuracy of the first scanning type.

A controller includes a processor and a memory storing instructions which, when executed by the processor, cause the processor to perform the following steps:
receiving first scan data transmitted by a radar; the first scan data being obtained by the radar scanning a first field of view with a first scanning type;
receiving image data transmitted by a camera device; the image data being obtained by the camera device imaging a second field of view; and the second field of view and the first field of view having an overlapping region;
searching for image information corresponding to each obstacle target from the image data according to the first scan data so as to identify a type of each obstacle target; and
when determining that there is an obstacle target required to be circumvented according to the type of each obstacle target, controlling the radar to scan the obstacle target required to be circumvented with a second scanning type and trace; wherein the scanning accuracy of the second scanning type is greater than the scanning accuracy of the first scanning type.

A target detection system includes: a radar used to provide scan data; a camera device used to provide image data; a vehicle control system used to control an operating state of a vehicle; and a controller respectively connected to the radar, the camera device, the vehicle control system, which is used to receive first scan data transmitted by the radar and image data transmitted by the camera device. The first scan data is obtained by the radar scanning a first field of view with a first scanning type, the image data is obtained by the camera device imaging a second field of view. The controller is further used to search for image information corresponding to each obstacle target from the image data according to the first scan data to identify a type of each obstacle target. The second field of view and the first field of view has an overlapping area. The controller is further used to when determining that there is an obstacle target required to be circumvented according to the type of each obstacle target, control the radar to scan the obstacle target required to be circumvented with a second scanning type and trace. The scanning accuracy of the second scanning type is greater than the scanning accuracy of the first scanning type.

In the target detection method, system and controller, the scanning accuracy of the second scanning type performed by the radar is greater than the scanning accuracy of the first scanning type, then the first scanning type acts as a preliminary positioning, and the second scanning type acts as a further positioning. In addition, the first scan data transmitted by the radar and the image data transmitted by the camera device are firstly received. Since the first scan data can provide preliminary positioning information of the obstacle target, the image information corresponding to the obstacle target is searched for from the image data according to the first scan data, which can reduce unnecessary image search, and speed up an image processing speed so as to quickly identify the type of the obstacle target. After that, when it is determined, according to the type of the obstacle target, that there is an obstacle target required to be circumvented, then the radar is controlled to scan the obstacle target required to be circumvented with the second scanning type and trace, that is, to perform a further scanning and tracing, so that an accurate trace and detection of the obstacle target during subsequent operations can be achieved via utilizing an advantage that the radar can accurately position. Therefore, the target detection method, system and controller improve the accuracy and efficiency of detecting the obstacle target, thereby reducing safety hazard of driving.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
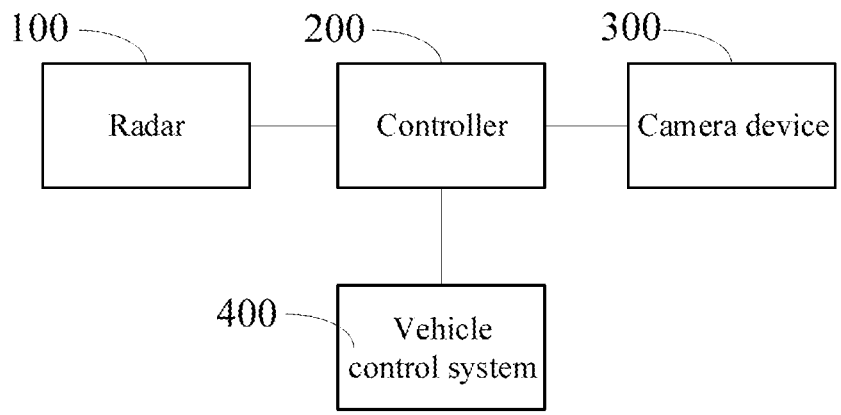
FIG. 1 is a block diagram of a target detection system in accordance with an embodiment.

In order to facilitate the understanding of the present disclosure, the present application will be described more fully hereinafter with reference to the accompanying drawings. Preferred embodiments of the disclosure are shown in the drawings. However, the disclosure may be embodied in many different forms and is not limited to the embodiments described herein. Rather, these embodiments are provided so that the understanding of the disclosure of the application will be more thorough and complete.

Unless otherwise defined, all technical and scientific terms used herein have the same meaning as commonly understood by one of ordinary skill in the art to the application. The terms used in the description of the application are only used for the purpose of describing specific embodiments, and are not intended to limit the present disclosure. The term "and/or" as used herein includes any and all combinations of one or more of the associated listed items.

A target detection system is provided according to an embodiment, and hardware structure involved thereof is as shown in FIG. 1. A radar 100 is used to provide scan data, which emits a certain measurement wave (the measurement wave is an electromagnetic wave for a lidar or a microwave/millimeter wave radar, and is an ultrasonic wave for an ultrasonic radar) to scan a field of view and receive reflected signal, thereby obtaining information such as distance, speed and position of the obstacle target from the radar. Specifically, the radar 100 can be a lidar, an ultrasonic radar, a microwave/millimeter wave radar, or other types of radar. However, although the radar 100 can provide accurate position information, it cannot provide image information to accurately identify and detect the obstacle target, and the power consumption thereof is high and scan speed thereof also has a certain limitation. A camera device 300 is used to provide image data, which can provide rich image information to identify and detect the obstacle target, but cannot guarantee an accuracy of a position, and when tracing an obstacle target for a long time, the problem of losing the obstacle target may occur. A controller 200 is a master control system, which is used to control an operation of the radar 100 and the camera device 300 and perform related data processing procedures. A vehicle control system 400 is used to control an operating state of a vehicle, which is for example an intelligent pilot in an autonomous driving vehicle. In this embodiment, the controller 200 controls the operation of the vehicle through the vehicle control system 400 according to the detection and trace of the obstacle target.

Further, the radar 100, the controller 200, and the camera device 300 can also be integrated into a single device to implement data sharing, thereby reducing the time of transmitting data, and avoiding error and delay of information generated in transmission of the information between each independently module, so as to lay a hardware foundation for high-precision target positioning and trace.

Figure 2:
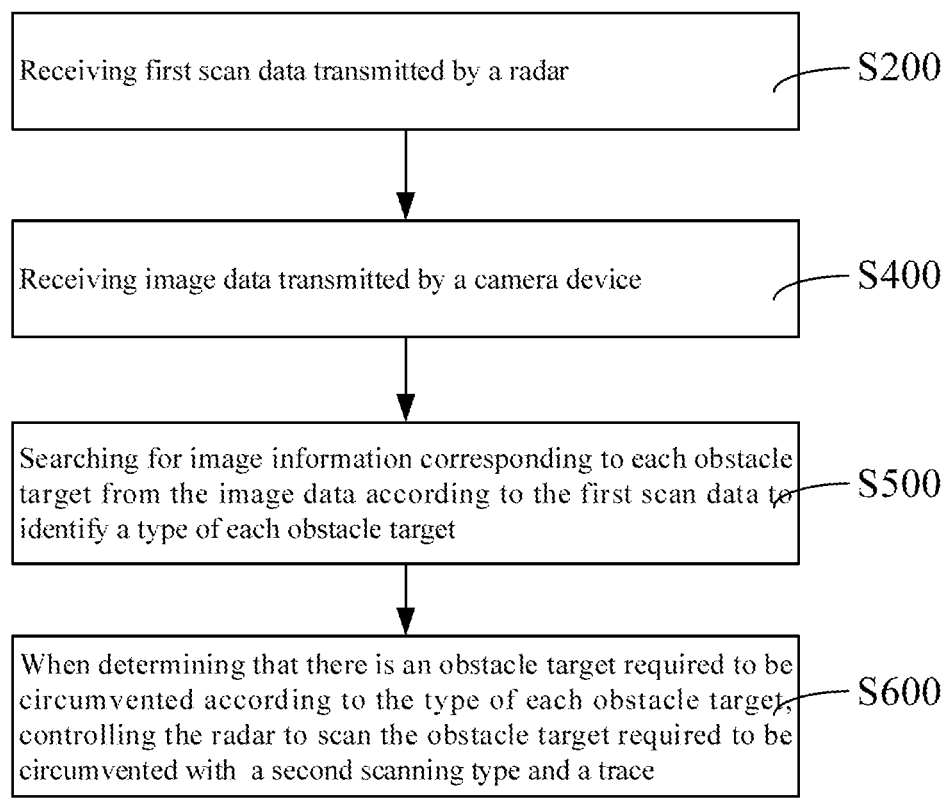
FIG. 2 is a flowchart of a target detection method in accordance with an embodiment.

In order to improve detection accuracy and efficiency of the obstacle target in the autonomous driving art and reduce traffic safety hazard, the radar 100 is used in combination with the camera device 300 in the present embodiment. Firstly, the scanning of the radar 100 is used to achieve a preliminary positioning of the obstacle target, then image data obtained by the camera device 300 is used to identify and detect a type of the obstacle target to determine whether the obstacle target is required to be circumvented, and finally the radar 100 is reused to accurately scan the obstacle target required to be circumvented, thereby ultimately achieving real-time positioning and trace of the obstacle target. In addition, a target detection method provided in this embodiment is performed by the controller 200, a specific principle of which is as follows (referring to FIG. 2).

In step S200, a first scan data transmitted by the radar 100 is received. The first scan data is obtained by the radar scanning a first field of view with a first scanning type 100.

In this step, the first scanning type is less accurate and has a wider scanning range, and the purpose thereof is to initially position the obstacle target for subsequent object recognition. An approximate distribution of the obstacle targets within the scanning range can be determined from the first scan data so as to obtain preliminary positioning information of each obstacle target. The preliminary positioning information can include, for example, preliminary distance information and orientation information. The orientation information can include, for example, a horizontal angle and a vertical pitch angle. In addition, under the premise that the time is permitted, when performing the first scanning type, the radar 100 can perform scanning at each time point separated by a set time period. In this case, the first scan data includes data of a plurality of scan within different time periods, that is, includes multi-frame scan data, so that the accuracy of the scan data can be improved.

In step S400, image data transmitted by the camera device 300 is received. The image data is obtained by the camera device imaging a second field of view 300, and the second field of view and the first field of view have an overlapping area.

Ranges of the first field of view and the second field of view can be the same or different, but there is at least an overlapping area between the two, and the overlapping area can be correspondingly set according to different situations. The target detection method provided in this embodiment is for detecting the obstacle target in the overlapping area.

In addition, an order of the step S200 and the step S400 is not limited thereto, as long as the first scan data and the image data can be received. For example, according to an actual operation of the radar 100 and the camera device 300, the order of the two steps can be interchanged, or both steps can be performed simultaneously.

In step S500, information corresponding to each obstacle target is searched for from the image data according to the first scan data to identify the type of each obstacle target.

This step acts as perform type identification and detection on the preliminary positioning obstacle target by the camera device 300. Specifically, image data corresponding to each obstacle target located in corresponding area can be directly found from the image data according to the preliminary positioning information obtained by the first scan data, so that the type of the obstacle target is identified according to the information of the image, such as color, texture, etc. Accordingly, in the present embodiment, the obstacle target is firstly roughly positioned by the radar 100, which can reduce unnecessary image searching process, thereby enabling a function of rapid identification of the obstacle target.

In step S600, when it is determined that there is an obstacle target required to be circumvented according to the type of each obstacle target, the radar 100 is controlled to scan the obstacle target required to be circumvented with a second scanning type and trace. The scanning accuracy of the second scanning type is greater than the scanning accuracy of the first scanning type.

In this step, a specific determining manner of determining whether there is the obstacle target required to be circumvented according to the type of each obstacle target is, for example, as follows: if the obstacle target is a pedestrian or a merged vehicle, it is required to be circumvented; and if the obstacle target is an object such as a garbage plastic bag blown by wind, it is not required to be circumvented.

In addition, the second scanning type acts as a preliminary scanning, which can detect a moving trajectory, a moving direction, and a moving speed, etc. of the obstacle target. The scanning accuracy of the second scanning type is greater than the scanning accuracy of the first scanning type. Specifically, compared with the first scanning type, a scan range of the second scanning type is smaller and more concentrated, an angular resolution is higher, and a scan speed is slower, and the like. Thus, an accurate positioning of the obstacle target to be circumvented is achieved. In addition, if the obstacle target is a moving object, it is necessary to measure the relative speed in real time.

Therefore, in the afore-described target detection method, the first scan data performed by the radar 100 can act as preliminary positioning on the obstacle target, so that the image information corresponding to each obstacle target is searched from the image data obtained by the camera device 300 according to the first scan data, which can reduce unnecessary image searching process and speed up image processing speed, thereby enabling rapid identification of the type of obstacle target. After that, when it is determined that there is the obstacle target required to be circumvented according to the type of the obstacle target, the radar 100 is controlled to scan the obstacle target required to be circumvented with the second scanning type and trace, that is, to perform the further scanning and trace, so that accurate positioning and tracing of the obstacle target during subsequent operations can be achieved via utilizing an advantage that the radar can accurately position. Therefore, the target detection method improves the accuracy and efficiency of detecting the obstacle target, thereby reducing safety hazard of driving.

In addition, compared with a method of simply using the camera device for detection, the afore-mentioned obstacle target detection method can not only accelerate the speed of identifying the type of the obstacle target via the initial positioning information, but also can, via a manner that after identifying the obstacle target, the radar is used to accurately position and trace the obstacle target to be circumvented, improve a defect that the camera device has poor stability for trace a moving object via using, for example, an image sequence and is easily of losing the target after long-time trace. In addition, compared with a method of simply using the camera device for detection, in the afore-mentioned obstacle target detection method, since the power consumption of the radar is generally high, the type of the obstacle target can be accurately determined by the image data provided by the camera device 300, so that the radar 100 can be quickly directed to the field of view, thereby reducing the power consumption thereof. Therefore, by appropriately utilizing the radar 100 and the camera device 300, the afore-described obstacle target detection method can achieve faster, more accurate, more stable, and lower power consumption identification and trace of the obstacle target.

Figure 3:
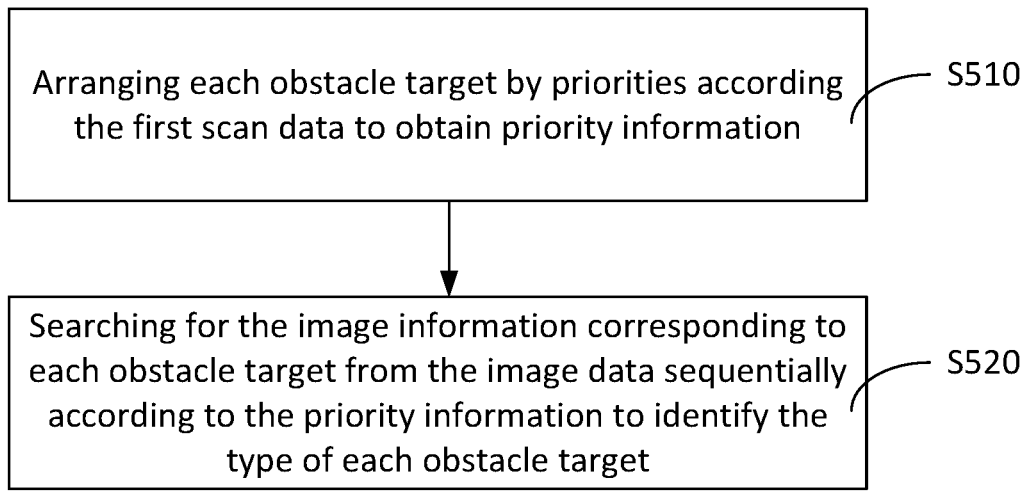
FIG. 3 is a specific flowchart of step S500 in the target detection method of the embodiment shown in FIG. 2.

Specifically, referring to FIG. 3, the step S500 specifically includes the following steps.

In step S510, the obstacle targets are arranged by priorities according to the first scan data to obtain priority information.

Figure 4:
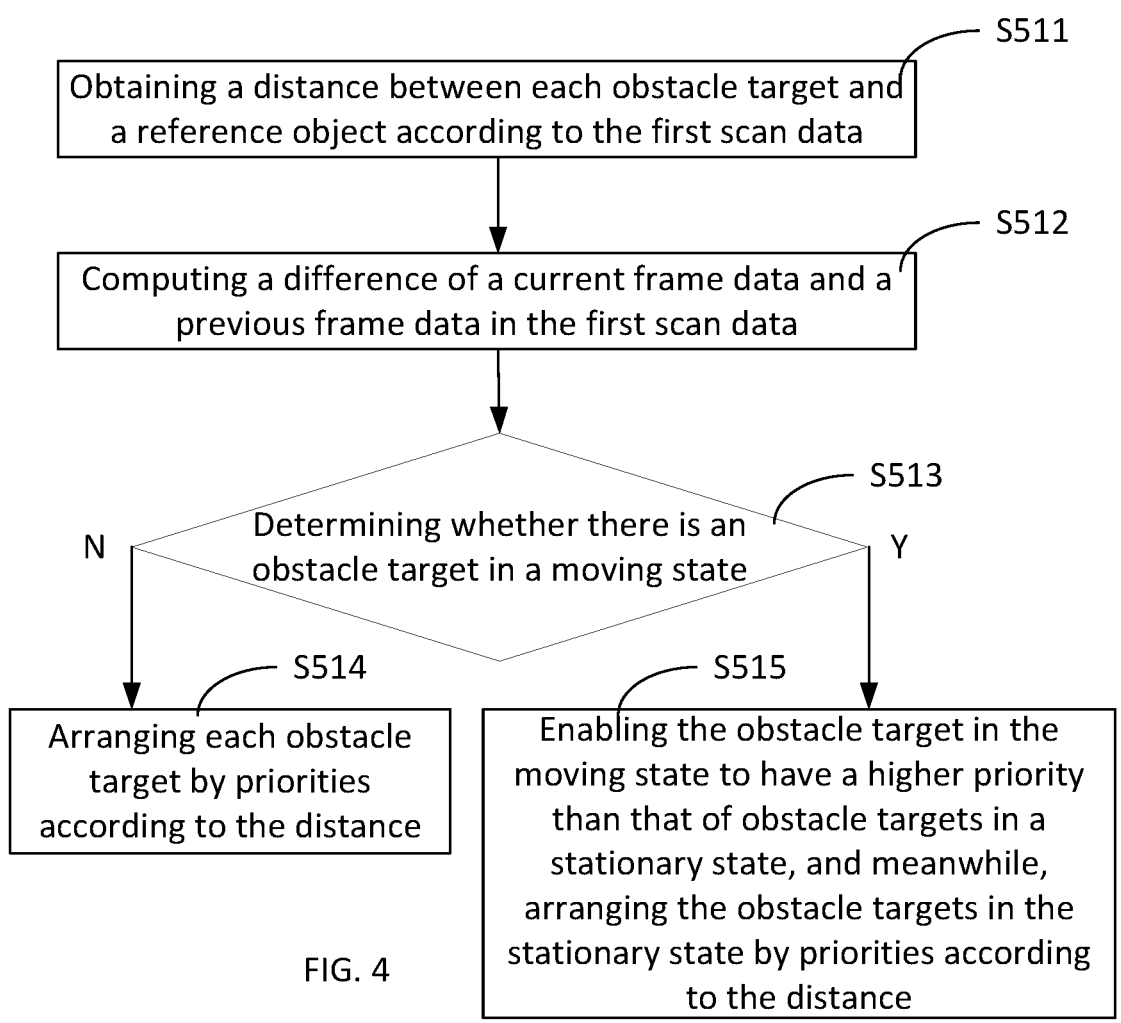
FIG. 4 is a specific flowchart of step S510 in the target detection method of the embodiment shown in FIG. 3.

The obstacle targets can be arranged by priorities according to set criteria. Referring to FIG. 4, a specific prioritization criterion is provided in the present embodiment. The step S510 specifically includes the following steps.

In step S511, a distance between each obstacle target and a reference object is obtained through the first scan data.

The reference object is, for example, the radar 100 or the vehicle.

In step S512, a difference of current frame data and previous frame data in the first scan data is computed. The first scan data includes a plurality of frame data, and scan time of each frame data is different.

In this step, the current frame data refers to data obtained via scanning by the radar 100 in real time, and the previous frame data refers to data obtained via scanning by the radar 100 at a time adjacent to and prior to the current time.

In step S513, whether there is an obstacle target in a moving state is determined, and if yes, step S515 is performed, otherwise step S514 is performed.

After a result of the difference computing is obtained in step S512, it can be determined whether there is an obstacle target in a moving state according to the result of the difference computing. When the obstacle target is in the moving state or in the stationary state, corresponding relationship between the current frame data and the previous frame data can also be different, thus it can be determined whether the obstacle target is in moving state according to the result of the difference computing. For example, if the current frame data of the obstacle target is the same as the previous frame data on the basis that displacement and speed of the vehicle itself has been compensated, it indicates that the obstacle target is in a stationary state; otherwise, it indicates that the obstacle target is in a moving state. In addition, if it is determined that the obstacle target is in a moving state, a moving direction and speed of the obstacle target can also be obtained according to the result of the difference computing.

It can be understood that it is not limited to the method of step S512 to determine whether the obstacle target is in a moving state. For example, the current frame data can be divided with the previous frame data, as long as it can be determined whether the obstacle target is in a moving state.

In step S514, the obstacle target in the moving state is prioritized higher than the obstacle target in the stationary state, and the obstacle targets in the stationary state are prioritized according to the distance.

Since the obstacle target in the moving state has the variability and complexity, the obstacle target in the moving state is given a higher priority to make it easier to improve the driving safety.

In addition, if there are a plurality of obstacle targets in a moving state, the priority can be further calculated according to parameters such as the moving direction and relative speed of each obstacle target.

In step S515, the obstacle targets are arranged by priorities according to the distance.

If the obstacle target is in a stationary state, then the nearest obstacle target is more threatening and thus is given a higher priority.

It can be understood that the specific implementation manner of step S510 is not limited thereto, as long as each obstacle target can be arranged by priorities according to the first scan data and according to the actual situation. For example, if the known obstacle targets are all in a stationary state, then it is not necessary to perform step S513 and step S515.

In step S520, image information corresponding to each obstacle target is sequentially searched from the image data according to the priority information to identify the type of each obstacle target.

Since the priority information of the obstacle target has a certain regularity, it is easy to find the corresponding image information in the image data according to the regularity of the priority information without performing full scanning on the image data, thereby further accelerating the identification speed of the types of the obstacle targets.

In addition, the obstacle target with greater threat can be determined in time according to the priority information, so that corresponding circumvention measures can be taken in time to further improve the driving safety.

It can be understood that the specific execution manner of step S500 is not limited thereto, as long as the image information corresponding to each obstacle target can be searched from the image data according to the first scan data to identify the type of each obstacle target.

Figure 5:
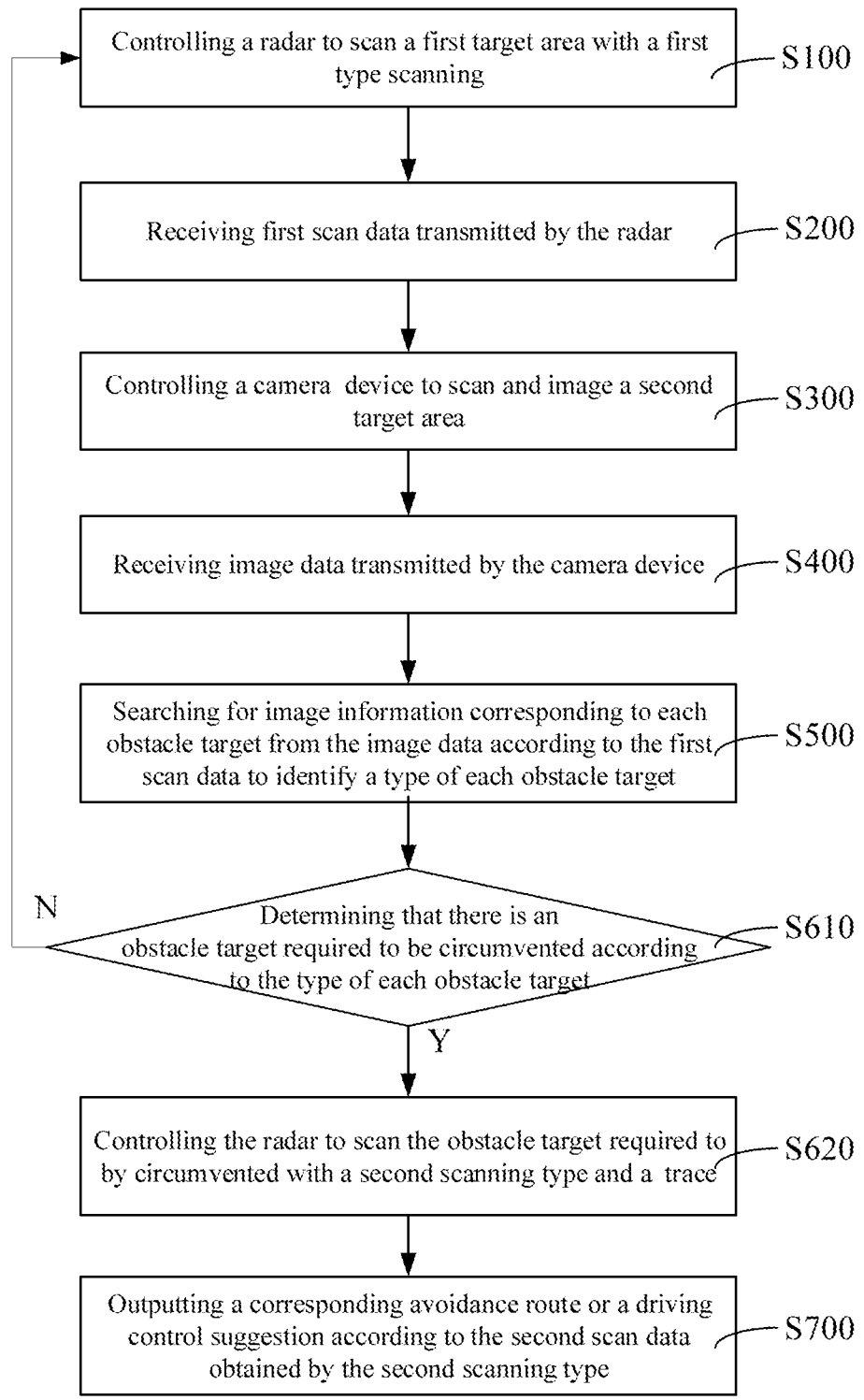
FIG. 5 is a flowchart of a target detection method in accordance with another embodiment.

Further, as shown in FIG. 5, the specific implementation manner of the target detection method can also be the following.

Prior to the step S200, the method further includes the following step.

In step S100, the radar 100 is controlled to scan the first field of view with the first scanning type.

Prior to the step S400, the method further includes the following step.

In step S300, the camera device 300 is controlled to scan and image the second field of view.

It should be noted that an order between the step S100 and the step S400 is not limited thereto. For example, the step S100 and the step S300 can be simultaneously performed, that is, the radar 100 and the camera device 300 are controlled to start collecting data at the same time, and then the step S200 and the step S400 are performed respectively. Further, depending on the actual situation, the step S100 or the step S400 can be performed by other devices on the premise that the target detection speed can be satisfied.

In addition, step S600 specifically includes the following steps.

In step S610, it is determined whether there is an obstacle target required to be circumvented according to the type of each obstacle target. If yes, step S620 is performed; otherwise, execution from step S100 is continued.

In step S620, the radar 100 is controlled to scan the obstacle target required to be circumvented with the second scanning type and trace.

Therefore, during the entire target detection process, operational states of the radar 100 and the camera device 300 are uniformly controlled by the controller 200, thereby facilitating timely detection of the obstacle target.

Further, after the step S620, the method further includes the following step.

In step S700, a corresponding circumvention route or driving control suggestion is output according to the second scan data obtained from the second scanning type performed by the radar 100.

The positioning information such as the speed and direction, etc. of the obstacle target relative to the vehicle can be measured according to the second scan data, and corresponding planning route can be made according to the type of the obstacle target. For example, if the obstacle target is a building or a pedestrian, the vehicle should be stopped immediately when the relative speed thereof is high and the distance therebetween is very close; and if the obstacle target is an incoming vehicle or a vehicle traveling in front, the speed thereof should be reduced and the speed thereafter is automatically adjusted according to the safe distance.

It can be understood that the aforementioned step S700 is not limited thereto. For example, the step S700 can be executed by the vehicle control system 400. At this time, the step S700 is not required to be set in the afore-described target detection method.

FIGS. 2 to 5 are flowcharts of the method according to the embodiments of the present disclosure. It can be understood that although the steps in the flowcharts of FIGS. 2 to 5 are sequentially displayed as indicated by the arrows, these steps are not necessarily sequentially performed in the order indicated by the arrows. Unless otherwise defined, the execution of these steps is not strictly sequential, and can be performed in other orders. Moreover, at least part of the steps in FIGS. 2 to 5 can include a plurality of sub-steps or stages, which are not necessarily performed at the same time, but can be performed at different times, and the order of the executions thereof is not necessarily performed sequentially, but can be performed in turn or alternately with other steps or at least part of a sub-step or stage of other steps.

Figure 6:
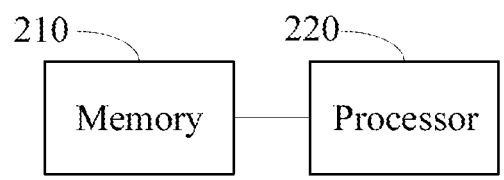
FIG. 6 is a block diagram of a controller in the target detection system of the embodiment shown in FIG. 1.

Further, as shown in FIG. 6, the controller 200 includes a memory 210 and a processor 220. The memory 210 stores instructions which, when executed by the processor 220, cause the processor 220 to execute the flow including the afore-described target detection method in the forgoing embodiments, which will not be described in detail. The memory 210 is a computer-readable storage medium, which can be a non-volatile storage medium such as a disk, an optical disk, a read-only-memory (ROM), etc. or a random-access-memory (RAM) or the like. In addition, the instructions can also be stored in one or more computer-readable storage media, and the instructions can be executed by one or more processors to include the forgoing two-dimensional lidar ranging method in each embodiment.

The technical features of the above embodiments can be arbitrarily combined. For the sake of brevity of description, all possible combinations of the technical features in the above embodiments are not described. However, as long as there is no collision in the combination of these technical features, it should be considered as the scope described in this specification.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A target detection method, comprising:
   receiving first scan data transmitted by a radar, the first scan data being obtained by the radar scanning a first field of view with a first scanning type;
   receiving image data transmitted by a camera device, the image data being obtained by the camera device imaging a second field of view, and the second field of view and the first field of view having an overlapping region;
   searching for image information corresponding to each obstacle target from the image data according to the first scan data to identify a type of each obstacle target; and
   when determining there is an obstacle target required to be circumvented according to the type of each obstacle target, controlling the radar to scan the obstacle target required to be circumvented with a second scanning type and trace, wherein the scanning accuracy of the second scanning type is greater than the scanning accuracy of the first scanning type,
   wherein the step of searching for image information corresponding to each obstacle target from the image data according to the first scan data to identify the type of each obstacle target comprises:
      arranging each obstacle target by priorities according to the first scan data to obtain priority information; and
      searching for the image information corresponding to each obstacle target from the image data sequentially according to the priority information to identity the type of each obstacle target.

2. The method according to claim 1, wherein the step of arranging each obstacle target by priorities according to the first scan data to obtain the priority information comprises:
   obtaining a distance between each obstacle target and a reference object according to the first scan data; and
   arranging each obstacle target by priorities according to the distance.

3. The method according to claim 1, wherein prior to the step of receiving the first scan data transmitted by the radar, the method further comprises:
   controlling the radar to scan the first field of view with the first scanning type.

4. The method according to claim 1, wherein prior to the step of receiving image data transmitted by the camera device, the method further comprises:
   controlling the camera device to scan and image the second field of view.

5. The method according to claim 1, wherein after the step of when determining that there is the obstacle target required to be circumvented according to the type of each obstacle target, controlling the radar to scan the obstacle target required to be circumvented with the second scanning type and the trace, the method further comprises:
   outputting a corresponding circumvention route or a driving control suggestion according to the second scan data obtained by the second scanning type.

6. The method according to claim 2, wherein prior to the step of arranging each obstacle target by priorities according to the distance, the method further comprises:
   determining whether there is an obstacle target in a moving state; if yes, enabling the obstacle target in the moving state to have a higher priority than that of obstacle targets in a stationary state, meanwhile, prioritizing the obstacle targets in the stationary state according to the distance; otherwise, proceeding the step of arranging each obstacle target by priorities according to the distance.

7. The method according to claim 3, wherein the step of when detem lining that there is the obstacle target required to be circumvented according to the type of each obstacle target, controlling the radar to scan the obstacle target required to be circumvented with the second scanning type and trace comprises:
   determining whether there is the obstacle target required to be circumvented according to the type of each obstacle target; if yes, controlling the radar to scan the obstacle target required to be circumvented with the second scanning type and the trace; otherwise, back to the step of controlling the radar to scan the first field of view with the first scanning type.

8. The method according to claim 6, wherein prior to the step of determining whether there is an obstacle target in the moving state, the method further comprises:
   computing the difference of current frame data and previous frame data in the first scan data, wherein the first scan data comprises a plurality of frame data obtained via scanning at different times; and
   meanwhile, the steps of determining whether there is an obstacle target in the moving state is:
   determining whether there is an obstacle target in the moving state according to a result of the difference computing.

9. A controller comprising a processor and a memory storing instructions which, when executed by the processor, cause the processor to perfom the following steps:
   receiving first scan data transmitted by a radar, the first scan data being obtained by the radar scanning a first field of view with a first scanning type;
   receiving image data transmitted by a camera device, the image data being obtained by the camera device imaging a second field of view, and the second field of view and the first field of view having an overlapping region;
   searching for image information corresponding to each obstacle target from the image data according to the first scan data to identify a type of each obstacle target; and
   when determining that there is an obstacle target required to be circumvented according to the type of each obstacle target, controlling the radar to scan the obstacle target required to be circumvented with a second scanning type and trace, wherein the scanning accuracy of the second scanning type is greater than the scanning accuracy of the first scanning type,
   wherein the step of searching for image information corresponding to each obstacle target from the image data according to the first scan data to identify the type of each obstacle target comprises:
      arranging each obstacle target by priorities according to the first scan data to obtain priority information; and
      searching for the image information corresponding to each obstacle target from the image data sequentially according to the priority information to identify the type of each obstacle target.

10. The controller according to claim 9, wherein the step of arranging each obstacle target by priorities according to the first scan data to obtain the priority information comprises:
   obtaining a distance between each obstacle target and a reference object according to the first scan data; and
   arranging each obstacle target by priorities according to the distance.

11. The controller according to claim 9, wherein prior to the step of receiving the first scan data transmitted by the radar, the method further comprises:
controlling the radar to scan the first field of view with the first scanning type.

12. The controller according to claim 9, wherein prior to the step of receiving image data transmitted by the camera device, the method further comprises:
controlling the camera device to scan and image the second field of view.

13. The controller according to claim 9, wherein after the step of when determining that there is the obstacle target required to be circumvented according to the type of each obstacle target, controlling the radar to scan the obstacle target required to be circumvented with the second scanning type and trace, the method further comprises:
outputting a corresponding circumvention route or a driving control suggestion according to the second scan data obtained by the second scanning type.

14. The controller according to claim 10, wherein prior to the step of arranging each obstacle target according to the distance, the method further comprises:
determining whether there is an obstacle target in a moving state, if yes, enabling the obstacle target in the moving state to have a higher priority than that of obstacle targets in a stationary state, and meanwhile, arranging the obstacle targets in the stationary state by priorities according to the distance; otherwise, proceeding the step of arranging each obstacle target by priorities according to the distance.

15. The controller according to claim 11, wherein the step of when determining that there is the obstacle target required to be circumvented according to the type of each obstacle target, controlling the radar to scan the obstacle target required to be circumvented with the second scanning type and the trace comprises:
determining whether there is the obstacle target required to be circumvented according to the type of each obstacle target, if yes, controlling the radar to scan the obstacle target required to be circumvented with the second scanning type and the trace, otherwise, back to the step of controlling the radar to scan the first field of view with the first scanning type.

16. The controller according to claim 14, wherein prior to the step of determining whether there is an obstacle target in the moving state, the method further comprises:
computing a difference of current frame data and previous frame data in the first scan data; wherein the first scan data comprises a plurality of frame data obtained via scanning at different times; and
meanwhile, the steps of determining whether there is an obstacle target in the moving state is:
determining whether there is an obstacle target in the moving state according to a result of the difference computing.

17. A target detection system, comprising:
a radar configured to provide scan data;
a camera device configured to provide image data;
a vehicle control system configured to control an operating state of a vehicle; and
a controller connected to the radar, the camera device, and the vehicle control system respectively, and configured to receive first scan data transmitted by the radar and the image data transmitted by the camera device;
wherein the first scan data is obtained by the radar scanning a first field of view with a first scanning type, and the image data is obtained by the camera device imaging a second field of view;
the controller is further configured to search for image information corresponding to each obstacle target from the image data according to the first scan data to identify a type of each obstacle target,
wherein the second field of view and the first field of view has an overlapping area; the controller is further configured to when determining that there is an obstacle target required to be circumvented according to the type of each obstacle target, control the radar to scan the obstacle target required to be circumvented with a second scanning type and trace,
wherein the scanning accuracy of the second scanning type is greater than the scanning accuracy of the first scanning type,
wherein, in searching for the image information corresponding to each obstacle target from the image data according to the first scan data to identify the type of each obstacle target, the controller is further configured to:
arrange each obstacle target by priorities according to the first scan data to obtain priority information; and
search for the image information corresponding to each obstacle target from the image data sequentially according to the priority information to identify the type of each obstacle target.

* * * * *